United States Patent [19]

Bauer et al.

[11] Patent Number: 4,875,787
[45] Date of Patent: Oct. 24, 1989

[54] BEARING BUSHING FOR UNIVERSAL JOINT PINS

[76] Inventors: Bernhard Bauer, Wulflingerstrasse 13, 8728 Hassfurt; Herbert Dobhan, Schleifweg 22, 8722 Bergrheinfeld, both of Fed. Rep. of Germany

[21] Appl. No.: 212,865

[22] Filed: Jun. 28, 1988

[30] Foreign Application Priority Data

Jul. 3, 1987 [DE] Fed. Rep. of Germany ... 8709201[U]

[51] Int. Cl.$^4$ .................... F16C 19/22; F16C 21/00; F16C 33/58
[52] U.S. Cl. .................... 384/548; 384/127; 384/425; 384/569; 464/128
[58] Field of Search ............. 384/126, 127, 425, 427, 384/452, 454, 455, 548, 564, 569; 464/14, 128, 132

[56] References Cited

U.S. PATENT DOCUMENTS

| | | | |
|---|---|---|---|
| 4,366,996 | 1/1983 | Grandel | 464/132 X |
| 4,553,858 | 11/1985 | Neugebauer et al. | 384/563 X |
| 4,637,740 | 1/1987 | Olschweski et al. | 384/425 |

FOREIGN PATENT DOCUMENTS

| | | | |
|---|---|---|---|
| 3115659 | 11/1982 | Fed. Rep. of Germany | 464/128 |
| 0874170 | 8/1961 | United Kingdom | 384/564 |

Primary Examiner—Thomas R. Hannon
Attorney, Agent, or Firm—Eugene E. Renz, Jr.

[57] ABSTRACT

In a bearing bushing for universal joint pins, a thrust washer on the bottom of the bearing bushing has a contact surface for a plurality of cylindrical rollers and for a universal joint pin. The thrust washer has a number of recesses on the side facing away from the cylindrical rollers which are distributed around the periphery and which extend from the lateral surface in a radial direction approximately over the length of the contact surface for the cylindrical rollers. Two adjacent recesses form a projection between them in each case.

5 Claims, 3 Drawing Sheets

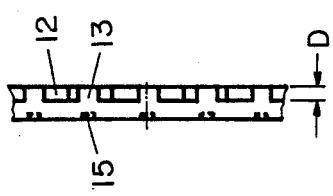
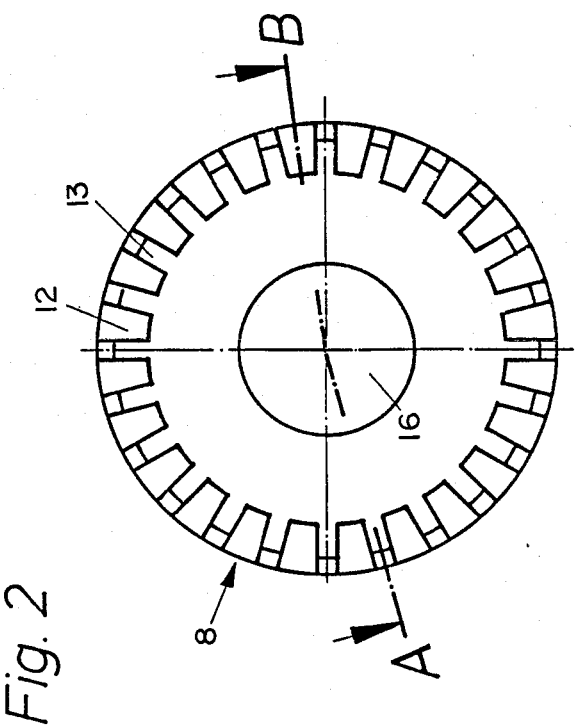
Fig. 3
Fig. 2
Fig. 4

BEARING BUSHING FOR UNIVERSAL JOINT PINS

FIELD OF THE INVENTION

The present invention relates to improvements in bearing bushings for universal joints.

BACKGROUND OF THE INVENTION

Bearing bushings of the type to which the present invention relate typically have a thrust washer located on the bottom of the bearing bushing which has a contact surface for the cylindrical rollers and for the universal joint pin. Bearing bushings of this general type are not new per se. For example, West German Utility Patent No. 84-30,909 shows a bearing bushing of this type. It is noted, however, that in these known bearing bushings, the lubrication between the end surfaces of the cylindrical rollers and the thrust washers in not sufficient, particularly under heavy axial loads. Furthermore, it has been observed that cracks form in these prior assemblies between the reinforced edge of the thrust washer and the contact surfaces for the universal joint pin.

SUMMARY OF THE INVENTION

With the foregoing in mind, it is an object of the present invention to provide an improvded bearing bushing of the above type characterized by novel features of construction and arrangement so that even heavy axial loads can be absorbed without difficulty and cracks or fissures are avoided between the reinforced edge of the thrust washer and the contact surface for the universal joint pin. To this end, in accordance with the present invention, the thrust washer is provided with a plurality of recesses distributed about its periphery to locate it on the side facing away from the cylindrical rollers. These recesses extend radially inwardly from the lateral surface approximately over the length of the contact surface for the cylindrical rollers. The adjacent recesses of the pattern in each case form a projection between them.

In the particular thrust washer configuration described above, lubricant pockets for contact with the rollers are formed as a result of the shrinkage of the plastic after injection molding or casting. These pockets extend over the length of the contact surface for the cylindrical rollers. Additionally, the wall thicknesses in the area of the reinforced edge are the same as in the central area of the thrust washer which means that no stress is developed when the plastic shrinks.

In accordance with another feature of the present invention, the faces of the projections directed towards the bottom of the bearing bushing and the surface of the thrust washer on the same side are co-planar so that the thrust washer is effectively supported in the area of the outer edge.

Still another object of the present invention is to provide means facilitating passage of lubricating grease to the cylindrical rollers during later lubrication after the bearing bushing is in use. To this end, the thrust washer is provided with radially outwardly facing grooves which extend from a central hole in a thrust washer to the contact surfaces for the cylindrical rollers.

BRIEF DESCRIPTION OF THE DRAWINGS

These and other objects of the present invention and the various features and details of the operation and construction thereof are hereinafter more fully set forth with reference to the accompanying drawings, wherein:

FIG. 2 is a top plan view of the thrust washer as viewed in FIG. 1 from the left;

FIG. 3 is a partial side view of the thrust washer according to FIG. 2 again as viewed from the left;

FIG. 4 is a sectional view taken on lines A-B through the thrust washer in FIG. 2.

DETAILED DESCRIPTION OF THE PREFERRED EMBODIMENT

Figure 1:
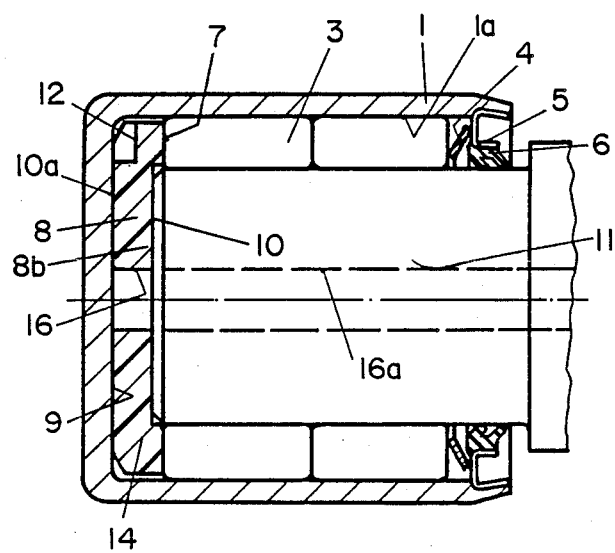
FIG. 1 is a longitudinal sectional view of a bearing bushing incorporating a thrust washer made in accordance with the present invention.

Referring now to the drawings and particularly FIG. 1 thereof, there is shown a bearing bushing generally designated by the numeral 1, having interior peripheral surface 1a which forms the raceway for cylindrical rollers 3 which in the present instance are arranged in two side-by-side rows. The rollers are retained in the bushing by means of a cup spring 4 which is braced against a retaining plate 5 on a sealing ring 6 against a surface 7 of a thrust washer 8. The thrust washer 8 which is preferably made of a plastic material is mounted at the bottom surface 9 of bearing bushing 1 and is formed with a large contact surface 10 for a universal joint pin 11. The outer axial end face 10a of the bearing bushing contacts the bottom surface 9 as shown. The thrust washer 8 is provided with a plurality of recesses 12 on the side thereof facing away from the cylindrical rollers 3. The recesses as best illustrated in FIG. 2 are uniformly distributed throughout the periphery and extend radially inwardly from the outer peripheral surface of 8a of thrust washer 8 approximately the length of the contact surface 7 for the cylindrical rollers 3. The recesses from projections 13 radiating out around the periphery of the thrust washer. The axial depth D of recesses 12 depends on the total thickness of thrust washer 8. If the thrust washer is of considerable thickness, the recesses 12 will be somewhat deeper than half the thickness. In the case of relatively thin thrust washers, the depth D of the recess 12 will be equal to slightly less than half the thickness. By this arrangement, all the walls in the area of the reinforced edge 14 are of about the same thickness and, therefore, by reason of the shrinkage characteristic of plastic, shallow radially oriented recess 15 which serve as lubricating pockets for the contact zone with the cylindrical rollers are formed on the side of the thrust washer on the side 8b of the thrust washer facing the cylindrical rollers 3. The number of these pockets corresponds to the number of radial projections of 13.

Figure 5:
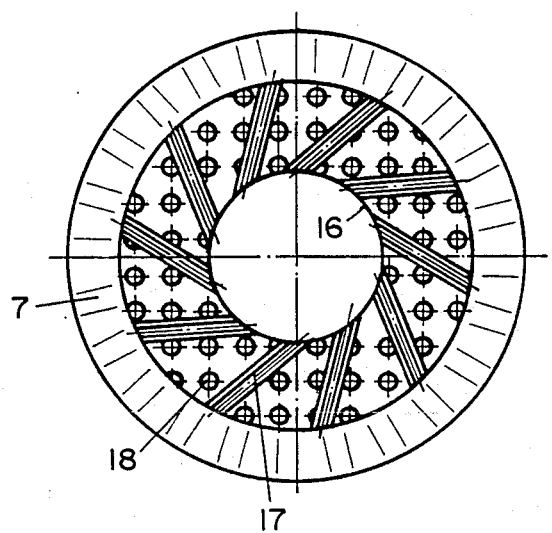
FIG. 5 is a top plan view of the thrust washer as viewed from the right in FIG. 1.

It is noted that the radial projections 13 are on the bottom support surface 9 of the bearing bushing and, therefore, provide support for surface 7 to accommodate thrust of the cylindrical rolles 3. Thrust washer 8 as best illustrated in FIG. 2 is provided with a central opening central bore 16 supplied with lubricating grease through a hole 16a in universal joint pin 11. Radially outwardly facing groove 17 are provided on the contact surface 10 for the universal joint pin 11 which, as illustrated in FIG. 5, extend from the hole 16. Accordingly, when the bearing bushing is lubricated at a later time, the lubricating grease is conducted through these grooves to the cylindrical rollers 3. Additionally, lubricating pockets 18 are formed in the contact surface 10 of the thrust washer 8.

While a particular embodiment of the invention has been illustrated and described herein, it is not intended to limit the invention and changes and modifications may be made therein within the scope of the following claims.

What is claimed is:

1. A bearing bushing for universal joint pins comprising:
    a thrust washer made of plastic disposed on a bottom surface of the bearing bushing having a contact surface for a plurality of cylindrical rollers and for a universal joint pin,
    a plurality of circumferentially spaced first recesses on a side surface of the thrust washer facing away from the cylindrical rollers,
    said first recesses having an axial depth equal to about half the thrust washer axial thickness, and
    said first recesses being distributed around the periphery of the thrust washer adjacent the outer peripheral edge thereof and extending radially inwardly from the outer peripheral surface of the thrust washer approximately the length of the contact surface of the thrust washer and cylindrical roller, two adjacent first recesses forming a centrally located, radially directed projection around the periphery of the thrust washer and a series of radially directed shallow second recesses in the opposite side surface of the thrust washer defining lubricant pockets.

2. A bearing bushing according to claim 1, characterized in that side faces of the projections (13) and a side surface (10a) of the thrust washer (8) are disposed in the same radial place.

3. A bearing bushing according to claim 1, characterized in that, on a side facing the universal joint pin (11), the thrust washer (8) is provided with radially outward-facing grooves (17), which extend from a central hole (16) in the thrust washer (8) to the contact surfaces (7) for the cylindrical rollers (3).

4. A bearing bushing as claimed in claim 1, wherein said second recesses are formed as a result of shrinkage of the plastic after the thrust washer forming process.

5. A bearing bushing as claimed in claim 4, wherein the number of second recesses corresponds to the number of projection.

* * * * *